United States Patent
Kim et al.

(10) Patent No.: US 8,669,930 B2
(45) Date of Patent: Mar. 11, 2014

(54) LIQUID CRYSTAL DISPLAY AND METHOD FOR DRIVING THE SAME

(75) Inventors: Seong Gyun Kim, Gunpo-si (KR); Tae Ho You, Anyang-si (KR)

(73) Assignee: LG Display Co., Ltd., Seoul (KR)

( * ) Notice: Subject to any disclaimer, the term of this patent is extended or adjusted under 35 U.S.C. 154(b) by 1321 days.

(21) Appl. No.: 11/967,675

(22) Filed: Dec. 31, 2007

(65) Prior Publication Data
US 2008/0231616 A1 Sep. 25, 2008

(30) Foreign Application Priority Data
Mar. 20, 2007 (KR) .................... P10-2007-0027195

(51) Int. Cl.
G09G 3/36 (2006.01)
G06F 3/038 (2013.01)
G09G 5/00 (2006.01)

(52) U.S. Cl.
USPC .................. 345/98; 345/87; 345/99; 345/204

(58) Field of Classification Search
USPC ................. 345/87, 204, 98–99; 348/446–449
See application file for complete search history.

(56) References Cited

U.S. PATENT DOCUMENTS

| | | | |
|---|---|---|---|
| 5,134,480 A * | 7/1992 | Wang et al. | 348/620 |
| 5,512,921 A * | 4/1996 | Mital et al. | 345/555 |
| 6,148,035 A * | 11/2000 | Oishi et al. | 375/240.26 |
| 6,452,579 B1 * | 9/2002 | Itoh et al. | 345/100 |
| 2001/0052887 A1* | 12/2001 | Tsutsui et al. | 345/87 |
| 2005/0254792 A1* | 11/2005 | Kimoto | 386/111 |
| 2006/0221001 A1* | 10/2006 | Matono et al. | 345/75.2 |

* cited by examiner

*Primary Examiner* — Jonathan Horner
(74) *Attorney, Agent, or Firm* — Brinks Gilson & Lione

(57) ABSTRACT

A liquid crystal display and a method for driving the same, wherein one or more horizontal lines carrying no data among horizontal lines of a progressive-processed frame can be compensated with data, are provided. The liquid crystal display includes a frame processor, a timing controller, and a data driver. The frame processor performs data compensation of at least one horizontal line carrying no data among horizontal lines of an input frame. The timing controller controls a driving operation of the frame compensated by the frame processor. The data driver drives the frame compensated by the frame processor on a liquid crystal display panel under control of the timing controller.

10 Claims, 8 Drawing Sheets

N+2th Frame
N+1th Frame
Nth Frame
N-1th Frame

LIQUID CRYSTAL DISPLAY AND METHOD FOR DRIVING THE SAME

CLAIM FOR PRIORITY

This application claims the benefit of Korean Patent Application No. P2007-0027195, filed on Mar. 20, 2007, which is hereby incorporated by reference as if fully set forth herein.

BACKGROUND OF THE INVENTION

1. Field of Invention

The present invention relates to a liquid crystal display and a method for driving the same, wherein one or more horizontal lines carrying no data among horizontal lines of a progressive-processed frame can be compensated with data.

2. Discussion of the Related Art

A liquid crystal display (LCD) displays an image by controlling optical transmittance of liquid crystal (LC) cells according to video signals. An active matrix LCD, which includes switching elements formed respectively at LC cells, is advantageous in implementing moving images since it can actively control the switching elements. As shown in FIG. 1, a thin film transistor (TFT) is typically used as each switching element of the active matrix LCD.

The active matrix LCD is driven in the following manner. As shown in FIG. 1, digital input data is converted into an analog data voltage based on a gamma reference voltage and the analog data voltage is provided to a data line DL while a scan pulse is then provided to a gate line GL to charge an LC cell Clc.

A gate electrode of the TFT is connected to the gate line GL, a source electrode of the TFT is connected to the data line DL, and a drain electrode of the TFT is connected to one end of a storage capacitor Cst and one end of the LC cell Clc.

A common voltage Vcom is provided to a common electrode of the LC cell Clc.

The storage capacitor Cst is charged to the data voltage applied from the data line DL when the TFT is turned on, and maintains the voltage of the LC cell Clc constant.

When a scan pulse is applied to the gate line GL, the TFT is turned on so that a channel is formed between the source and drain electrodes, thereby allowing the voltage on the data line DL to be applied to the pixel electrode of the LC cell Clc. Thus, an electric field produced between the pixel and common electrodes changes the arrangement of LC molecules of the LC cell Clc, thereby modulating light incident on the LC cell Clc.

The LCD, which includes pixels, each having the structure described above, is generally used as a display component of a video display device such as a television receiver or a computer monitor.

The television receiver having the LCD uses a 2D deinterlacer or a 3D deinterlacer provided in it to convert an interlaced signal input from a base station into a progressive signal. However, the television receiver generally uses the 2D deinterlacer since the 2D deinterlacer is low-priced while the 3D deinterlacer is expensive.

How the interlaced signal and the progressive signal are produced will now be described with reference to FIG. 2.

As shown in FIG. 2, a frame A1 captured by a camera, which includes an original signal, is converted into a top field A2 and a bottom field A3, each including an interlaced signal, through a sampling process performed at a base station or the like. The top field A2 and the bottom field A3 are then transmitted to a television receiver.

The top field A2 includes odd horizontal lines carrying no data and even horizontal lines carrying data. The data carried in the even horizontal lines of the top field A2 is the same as that carried in even horizontal lines of the frame A1 including the original signal.

The bottom field A3 includes odd horizontal lines carrying data and even horizontal lines carrying no data. The data carried in the odd horizontal lines of the bottom field A3 is the same as that carried in odd horizontal lines of the frame A1 including the original signal.

When the television receiver inputs the top field A2 and the bottom field A3, a 2D deinterlacer in the television receiver converts the top field A2 including an interlaced signal into an even frame A4 including a progressive signal while converting the bottom field A3 including an interlaced signal into an odd frame A5 including a progressive signal.

Specifically, the 2D deinterlacer fills data in the odd horizontal lines carrying no data among the horizontal lines of the top field A2, thereby converting the top field A2 including an interlaced signal into the even frame A4 including a progressive signal. That is, data of the even horizontal lines of the even frame A4 is kept identical to that of the even horizontal lines of the top field A2, while the odd horizontal lines of the even frame A4 are filled with data by the 2D deinterlacer. The data filled in the odd horizontal lines of the even frame A4 is produced using the data carried in the even horizontal lines of the top field A2. Specifically, each odd horizontal line of the even frame A4 is filled with an average value of the data of a pair of even horizontal lines vertically adjacent to the odd horizontal line.

On the other hand, the 2D deinterlacer fills data in the even horizontal lines carrying no data among the horizontal lines of the bottom field A3, thereby converting the bottom field A3 including an interlaced signal into the odd frame A5 including a progressive signal. That is, data of the odd horizontal lines of the odd frame A5 is kept identical to that of the odd horizontal lines of the bottom field A3, while the even horizontal lines of the odd frame A5 are filled with data by the 2D deinterlacer. The data filled in the even horizontal lines of the odd frame A5 is produced using the data carried in the odd horizontal lines of the bottom field A3. Specifically, each even horizontal line of the odd frame A5 is filled with an average value of the data of a pair of odd horizontal lines vertically adjacent to the even horizontal line.

When the television receiver converts a input interlaced signal into a progressive signal using the 2D deinterlacer included in it and displays a corresponding image on the LCD, data is alternately absent and present in a series of consecutive frames (N−1th Frame, Nth Frame, N+1th Frame, and N+2th Frame), such that data is absent in the frames (N−1th Frame and N+1th Frame) as shown in FIG. 3. Since the LCD performs polarity inversion to reverse the polarity of data on a frame by frame basis, the N−1th and N+1th frames have data of the same polarity while Nth and N+2th frames have data of the same polarity which is opposite to that of the N−1th and N+1th frames.

Accordingly, if the N−1th and N+1th frames have no data as shown in FIG. 3, the N−1th and N+1th frames having no data are not displayed on the LC panel, while the Nth and N+2th frames having data are displayed on the LC panel. That is, data of the same polarity is continuously provided to each pixel of the LCD since the data in the Nth and N+2th frames with the same polarity is provided to the LC panel.

Flickering occurs in images displayed on the LCD if data is absent in one of a series of neighboring frames as described above. In addition, if data of the same polarity is continuously provided to each pixel of the LCD, after-image occurs and liquid crystal is degraded due to drive characteristics of LC molecules provided in each pixel.

SUMMARY

A liquid crystal display includes a frame processor that performs data compensation of at least one horizontal line carrying no data among horizontal lines of an input frame; a timing controller that controls a driving operation of the frame compensated by the frame processor; and a data driver that supplies the frame compensated by the frame processor to a liquid crystal display panel under control of the timing controller.

in one embodiment, the frame processor may include a frame memory that stores a last frame and a second last frame that have been input before a current frame; a comparator that compares the input current frame with the previous frames stored in the frame memory and generates a compensation approval signal according to the comparison result; and a data compensator that performs data compensation of at least one horizontal line carrying no data among horizontal lines of the input frame in response to the compensation approval signal.

In another aspect of the present disclosure, a method for driving a liquid crystal display includes performing data compensation of at least one horizontal line carrying no data among horizontal lines of an input frame; and supplying the compensated frame to a liquid crystal display panel.

IN one embodiment, the step of performing the data compensation may include storing a last frame and a second last frame that have been input before a current frame; comparing the input current frame with the stored previous frames and generating a compensation approval signal according to the comparison result; and performing data compensation of at least one horizontal line carrying no data among horizontal lines of the input frame in response to the compensation approval signal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
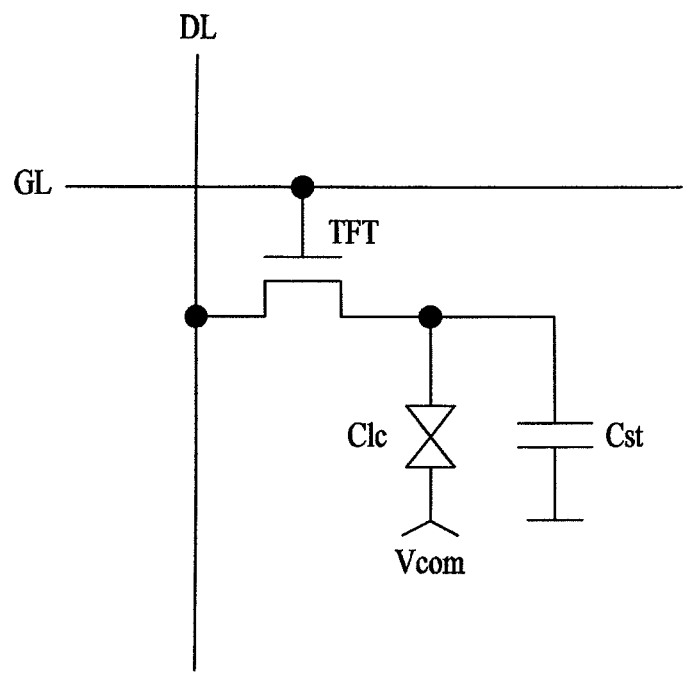
FIG. 1 is an equivalent circuit diagram of each pixel of a general LCD.
Figure 2:
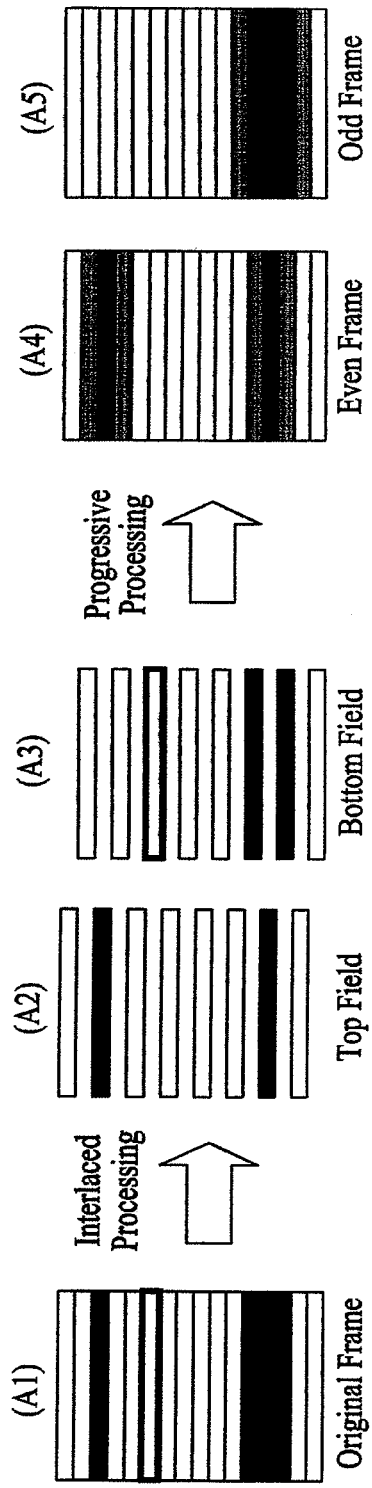
FIG. 2 illustrates interlaced and progressive signals used in a television receiver using a general LCD.
Figure 3:
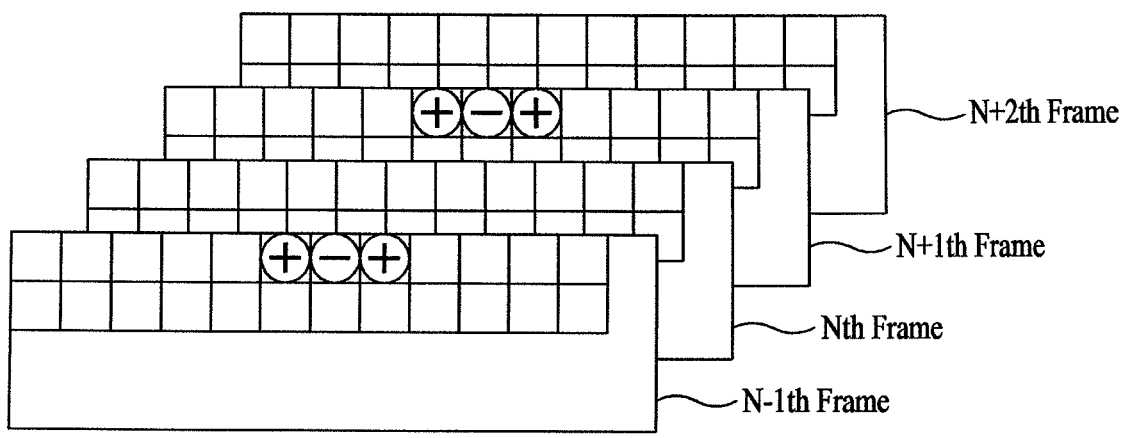
FIG. 3 illustrates frames displayed on the LCD of the general television receiver.
Figure 4:
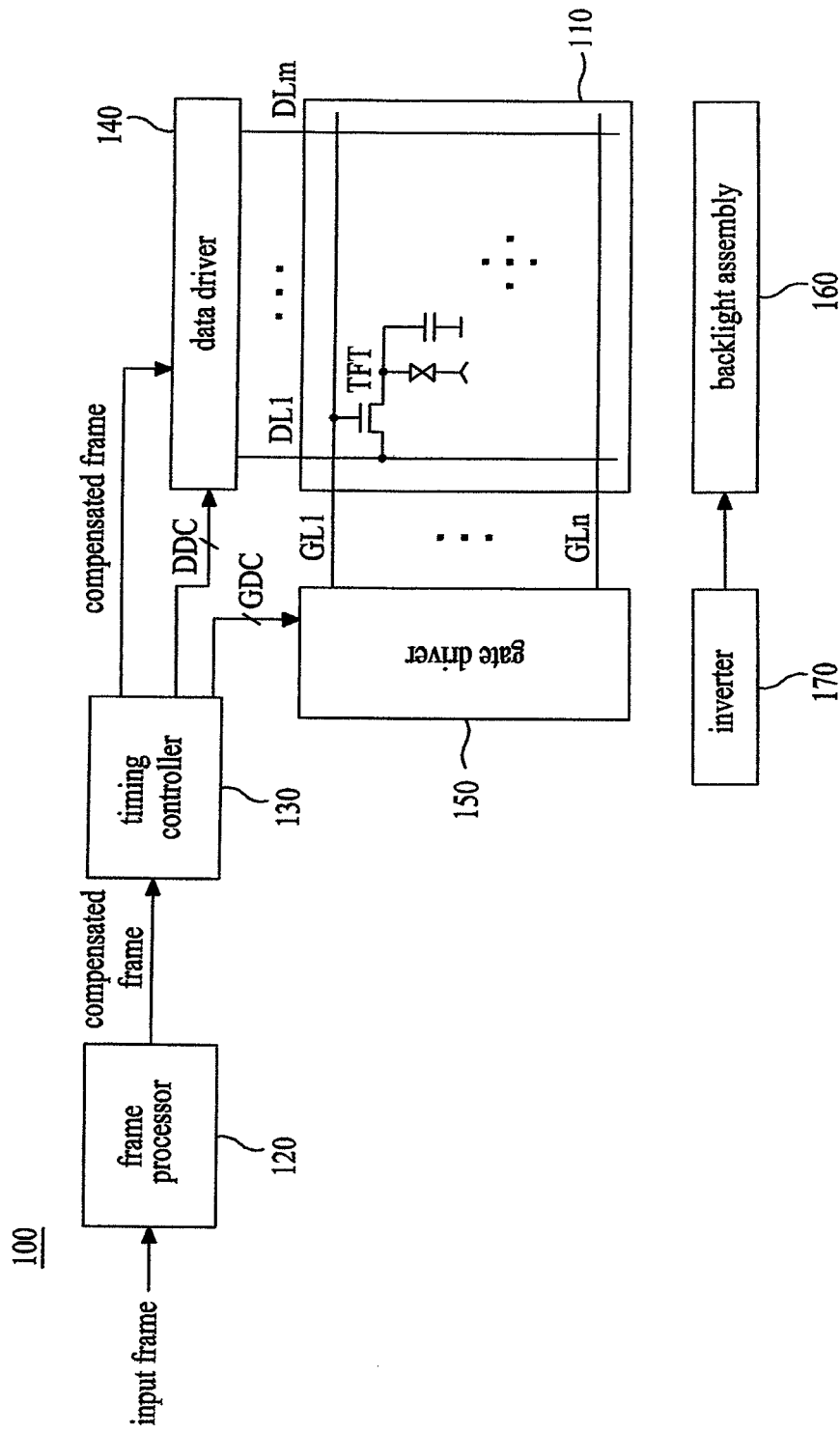
FIG. 4 is a block diagram of a liquid crystal display (LCD) according to an embodiment of the disclosure.

FIG. 4 is a block diagram of a liquid crystal display (LCD) according to an embodiment of the present disclosure.

As shown in FIG. 4, the LCD 100 according to the disclosure includes an LCD panel 110, a frame processor 120, a timing controller 130, a data driver 140, a gate driver 150, a backlight assembly 160, and an inverter 170. The LCD panel 110 includes multiple data lines DL1 to DLm and multiple gate lines GL1 to GLn, which cross each other, and Thin Film Transistors (TFTs) which are formed to drive LC cells Clc at the intersections of the data lines DL1 to DLm and the gate lines GL1 to GLn. The frame processor 120 performs data compensation of horizontal lines carrying no data among horizontal lines of an input frame including a progressive signal. The timing controller 130 controls the driving of a frame having data compensated by the frame processor 120. The data driver 140 drives the frame having data compensated by the frame processor 120 on the LCD panel 110 under control of the timing controller 130. The gate driver 150 sequentially provides a scan pulse to the gate lines GL1 to GLn of the LCD panel 110 under control of the timing controller 130. The backlight assembly 160 emits light to the LCD panel 110. The inverter 170 applies AC voltage and current to the backlight assembly 160.

The LCD panel 110 includes liquid crystal interposed between two glass substrates. The data lines DL1 to DLm and the gate lines GL1 to GLn cross each other at right angles on the lower glass substrate of the LCD panel 110. TFTs are formed at the intersections of the data lines DL1 to DLm and the gate lines GL1 to GLn. Each TFT provides data on a corresponding one of the data lines DL1 to DLm to the corresponding LC cell Clc in response to the scan pulse. The gate electrode of each TFT is connected to a corresponding one of the gate lines GL1 to GLn and the source electrode is connected to a corresponding one of the data lines DL1 to DLm. The drain electrode of each TFT is connected to a pixel electrode of a corresponding LC cell Clc and a storage capacitor Cst.

Each TFT is turned on in response to a scan pulse that is provided to the gate of the TFT via a corresponding one of the gate lines GL1 to GLn which is connected to the gate. When the TFT is turned on, video data on a corresponding one of the data lines DL1 to DLm, which is connected to the drain of the TFT, is provided to a pixel electrode of a corresponding LC cell Clc.

The frame processor 120 sequentially inputs frames, each including a progressive signal, from the system and performs data compensation of horizontal lines carrying no data among horizontal lines of the input odd and even frames and then outputs the compensated frames to the timing controller 130. This frame processor 120 performs data compensation of the odd and even frames input from the system by inserting compensation data into horizontal lines carrying no data among the horizontal lines of the frames, each including a progressive signal.

Here, the frame processor 120 can be implemented so as to perform data compensation of input frames using a variety of compensation data as described below.

The frame processor 120 can be implemented so as to perform data compensation of input frames using compensation data preset in the frame processor 120.

The frame processor 120 can also be implemented so as to calculate an average value of the data of the input odd and even frames and to use the calculated average data as compensation data.

The frame processor 120 can also be implemented so as to use data of the highest or lowest gray level among the data of the input odd and even frames as compensation data.

The timing controller 130 provides a frame having data compensated by the frame processor 120 to the data driver 140 and controls the time to drive the compensated frame. The timing controller 130 generates a data drive control signal DDC and a gate drive control signal GDC using a horizontal/vertical synchronization signal H and V from the system according to a clock signal CLK from the system and provides the generated data and gate drive control signals DDC and GDC to the data and gate drivers 140 and 150, respectively. Here, the data drive control signal DDC includes a source shift clock SSC, a source start pulse SSP, a polarity control signal POL, and a source output enable signal SOE and the gate drive control signal GDC includes a gate shift clock GSC, a gate start pulse GSP, and a gate output enable signal GOE.

The data driver 140 inputs a frame compensated by the frame processor 120 through the timing controller 130 according to the data drive control signal DDC provided from the timing controller 130 and supplies the input frame to the LC panel 110.

The gate driver 150 sequentially generates and provides a scan signal to the gate lines GL1 to GLn in response to the gate drive control signal GDC provided from the timing controller 130.

The backlight assembly 160, which is disposed at the rear side of the LC panel 110, is driven by voltage and current provided from the inverter 170 to emit light to the LC panel 110.

The inverter 170 converts an internally generated square wave signal into a triangular wave signal and compares the triangular wave signal with a DC power supply voltage VCC provided from the system and generates a burst dimming signal at a level proportional to the comparison result. Upon the generation of the burst dimming signal defined according to the internal square wave signal, the inverter 170 controls generation of voltage and current to be provided to the backlight assembly 160 according to the burst dimming signal.

Although the frame processor 120 and the timing controller 130 are implemented separately in the above example, the present invention is not limited to the example. For example, the frame processor 120 can also be incorporated into the timing controller 130 so that they are implemented as a single chip.

Figure 5:
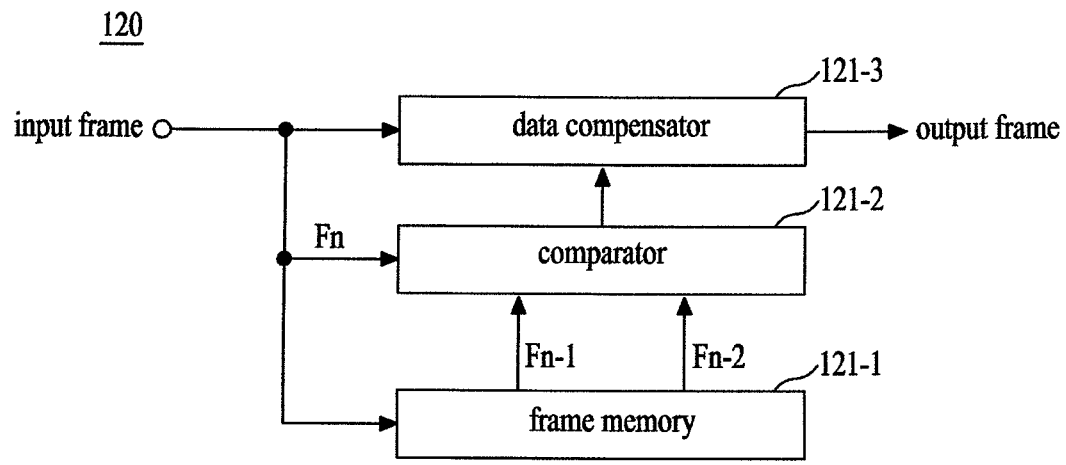
FIG. 5 is a block diagram of an embodiment of a frame processor shown in FIG. 4.

FIG. 5 is a block diagram of an embodiment of the frame processor shown in FIG. 4.

As shown in FIG. 5, the frame processor 120 according to the embodiment of the disclosure includes a frame memory 121-1, a comparator 121-2, and a data compensator 121-3. The frame memory 121-1 stores previous frames. The comparator 121-2 compares a input current frame with previous frames stored in the frame memory 121-1 and generates a compensation approval signal according to the comparison result. The data compensator 121-3 performs data compensation of the input frame in response to the compensation approval signal 121-2.

Figure 6:
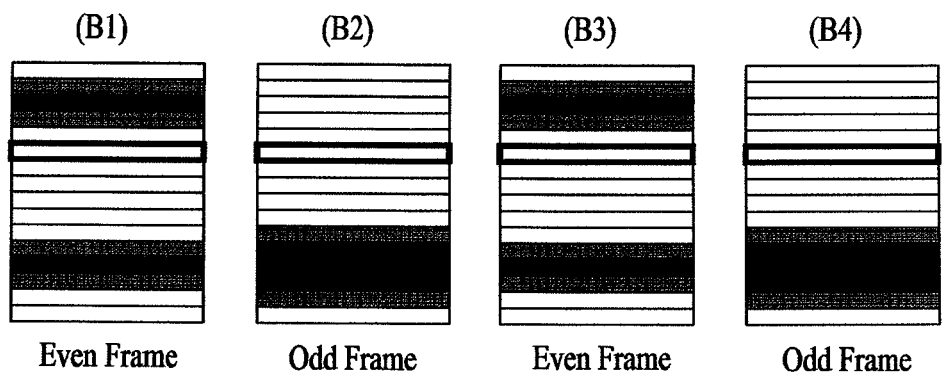
FIG. 6 illustrates how frames are input to an LCD according to the disclosure.

The frame memory 121-1 stores frames sequentially inputted from the system. Specifically, the frame memory 121-1 stores a last frame Fn-1 and a second last frame Fn-2 inputted before a current frame Fn, which are used to recognize a regular frame pattern as shown in FIG. 6. The last frame Fn-1 is a frame that has been input immediately before the current frame Fn and the second last frame Fn-2 is a frame that has been input immediately before the last frame Fn-1. Each of the current frame Fn, the last frame Fn-1, and the second last frame Fn-2 includes a progressive signal.

When receiving the current frame Fn from the system, the comparator 121-2 reads the last frame Fn-1 and the second last frame Fn-2 stored in the frame memory 121-1 and compares a progressive pattern of the current frame Fn with a progressive pattern of the last frame Fn-1 while comparing the progressive pattern of the current frame Fn with a progressive pattern of the second last frame Fn-2. Here, the progressive pattern of each frame is the pattern of arrangement of horizontal lines carrying data and horizontal lines carrying no data among the horizontal lines of the frame.

For example, if an even frame B3 shown in FIG. 6 is the current frame Fn input from the system, an even frame B1 is the second last frame Fn-2 stored in the frame memory 121-1 and an odd frame B2 is the last frame Fn-1 stored in the frame memory 121-1. In this case, the comparator 121-2 compares a progressive pattern of the even frame B3 with a progressive pattern of the odd frame B2 and also compares the progressive pattern of the even frame B3 with a progressive pattern of the even frame B1. The comparison result is that the progressive patterns of the even frame B3 and the odd frame B2 are different and the progressive patterns of the even frame B3 and the even frame B1 are identical as shown in FIG. 6.

On the other hand, if the odd frame B4 shown in FIG. 6 is the current frame Fn input from the system, the even frame B3 is the last frame Fn-1 stored in the frame memory 121-1 and the odd frame B2 is the second last frame Fn-2 stored in the frame memory 121-1. In this case, the comparator 121-2 compares the progressive pattern of the odd frame B4 with the progressive pattern of the even frame B3 and also compares the progressive pattern of the odd frame B4 with the progressive pattern of the odd frame B2. The comparison result is that the progressive patterns of the odd frame B4 and the even frame B3 are different and the progressive patterns of the odd frame B4 and the odd frame B2 are identical as shown in FIG. 6.

If the comparison result of the frames is that the progressive patterns of the current frame Fn and the second last frame Fn-2 are identical while the progressive patterns of the current frame Fn and the last frame Fn-1 are different, the comparator 121-2 generates a compensation approval signal requesting data compensation of the frame and outputs the compensation approval signal to the data compensator 121-3.

When the comparator 121-2 has generated the compensation approval signal, the data compensator 121-3 inserts compensation data into horizontal lines carrying no data among horizontal lines of the input frame.

Figure 7:
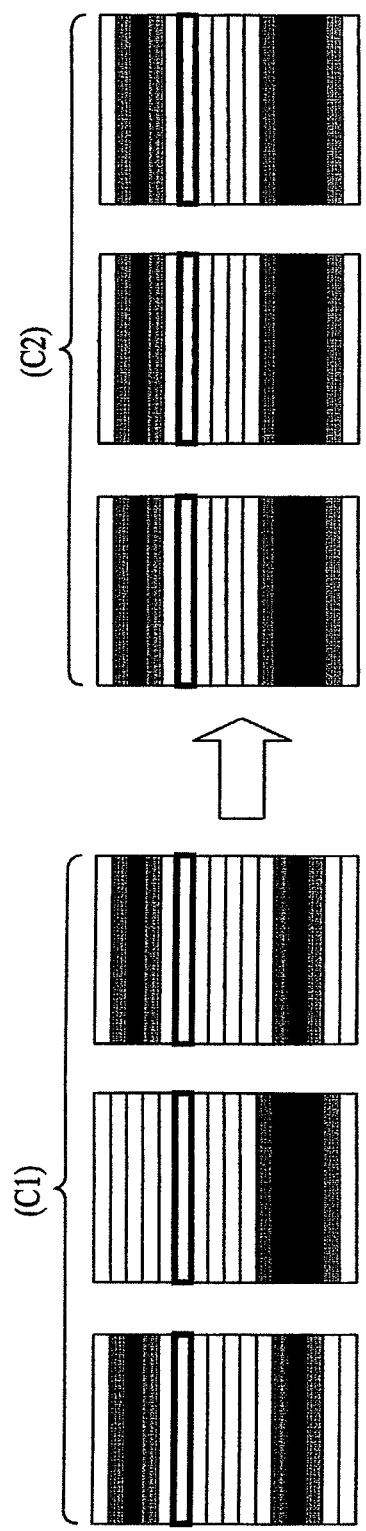
FIG. 7 illustrates how frames are compensated at the frame processor shown in FIG. 4.

For example, when frames C1, each including a progressive signal, have progressive patterns as shown in FIG. 7 before they are compensated, the data compensator 121-3 inserts compensation data into horizontal lines carrying no data among horizontal lines of each input frame to generate compensated frames C2. In this case, the compensated frames C2 of FIG. 7 have the same progressive pattern.

The data compensator 121-3 can be implemented so as to perform data compensation of input frames using compensation data preset in the data compensator 121-3.

The data compensator 121-3 can also be implemented so as to calculate an average value of the data of the input odd and even frames and to use the calculated average data as compensation data.

The data compensator 121-3 can also be implemented so as to use data of the highest or lowest gray level among the data of the input odd and even frames as compensation data.

Figure 8:
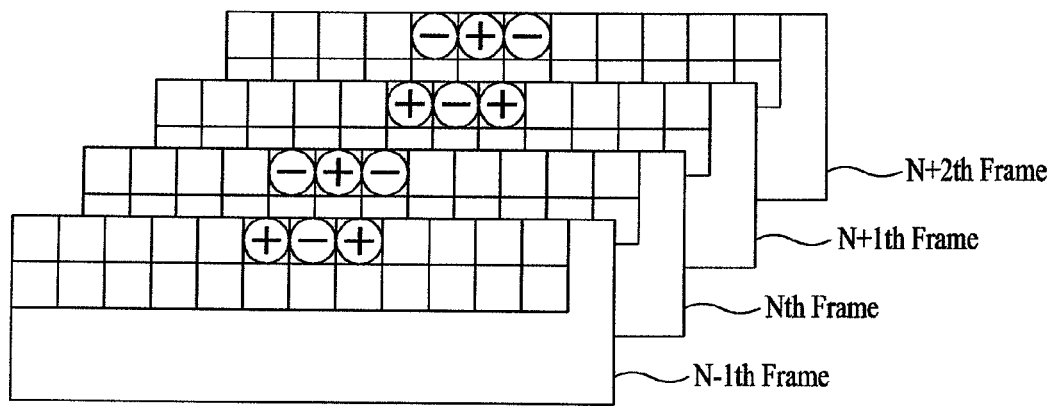
FIG. 8 illustrates how frames are driven on an LCD according to the disclosure.

Each frame including a progressive signal is compensated for lack of data as shown in FIG. 7 so that data is filled in horizontal lines of all frames, each including a progressive signal. This allows all consecutive frames (N−1th Frame, Nth Frame, N+1th Frame, and N+2th Frame) to have data as shown in FIG. 8.

In this manner, the disclosed structure allows all frames, each including a progressive signal, to have data, thereby preventing flickering which would otherwise occur when data is absent in one of a series of neighboring frames. This also allows the polarity of data provided to each pixel to be reversed on a frame by frame basis. In this manner, the disclosed structure makes it possible to normally perform polarity inversion on a frame by frame basis, thereby preventing after-image and liquid crystal degradation which would otherwise occur when data of the same polarity is continuously provided to each pixel.

Figure 9:
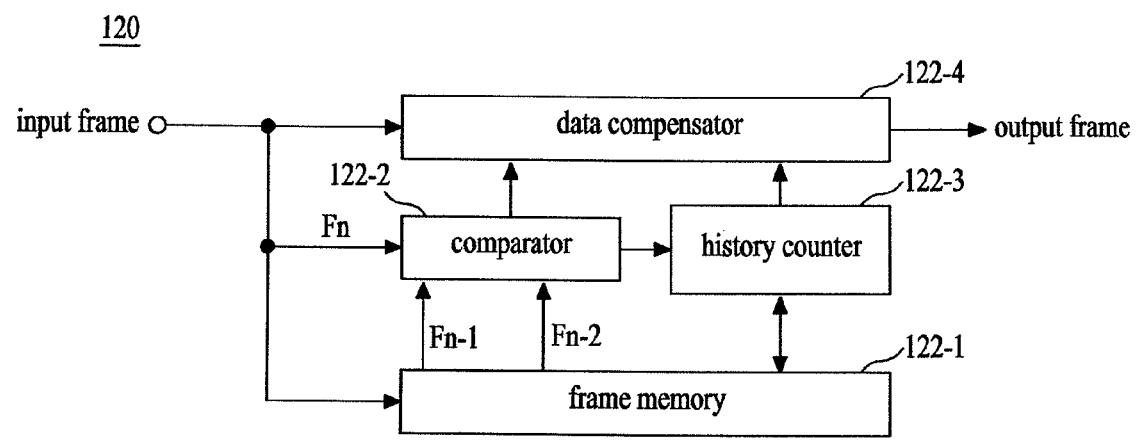
FIG. 9 is a block diagram of another embodiment of the frame processor shown in FIG. 4.

FIG. 9 is a block diagram of another embodiment of the frame processor shown in FIG. 4.

As shown in FIG. 9, the frame processor 120 according to this embodiment of the disclosure includes a frame memory 122-1, a comparator 122-2, a history counter 122-3, and a data compensator 122-4. The frame memory 122-1 stores previous frames. The comparator 122-2 compares a input current frame with previous frames stored in the frame memory 122-1 and generates a first compensation approval signal and a frame pattern recognition signal according to the comparison result. The history counter 122-3 inputs the frame pattern recognition signal from the comparator 122-2 and counts the number of occurrences of a regular frame pattern and generates a second compensation approval signal according to the counted number of occurrences of the regular frame pattern. The data compensator 122-4 performs data compensation of the input frame in response to the first and second compensation approval signals.

The frame memory 122-1 stores frames sequentially input from the system. Specifically, the frame memory 122-1 stores a last frame Fn-1 and a second last frame Fn-2 input before a current frame Fn, which are used to recognize the frame pattern as shown in FIG. 6.

When receiving the current frame Fn from the system, the comparator 122-2 reads the last frame Fn-1 and the second last frame Fn-2 stored in the frame memory 122-1 and compares a progressive pattern of the current frame Fn with a progressive pattern of the last frame Fn-1 while comparing the progressive pattern of the current frame Fn with a progressive pattern of the second last frame Fn-2.

If the comparison result is that the progressive patterns of the current frame Fn and the second last frame Fn-2 are identical while the progressive patterns of the current frame Fn and the last frame Fn-1 are different, the comparator 122-2 generates a first compensation approval signal requesting data compensation of the input frame and outputs the first compensation approval signal to the data compensator 122-4 while generating and outputting a frame pattern recognition signal to the history counter 122-3. Especially, since frames, each including a progressive signal, repeat regular progressive patterns every 3 consecutive frames as shown in FIG. 6, the comparator 122-2 generates a frame pattern recognition signal each time the regular progressive patterns are recognized. Here, the regular progressive patterns are recognized when the progressive patterns of the current frame Fn and the second last frame Fn-2 are identical while the progressive patterns of the current frame Fn and the last frame Fn-1 are different. That is, the number of occurrences of the regular frame pattern counted by the history counter 122-3 is the number of occurrences of the regular progressive patterns, which repeat regularly every 3 frames.

The comparator 122-2 recognizes the regular progressive patterns on a pixel by pixel basis and generates a frame pattern recognition signal. Noise generated at the system may cause an error in the frame pattern recognition. Therefore, according to the disclosure, a margin in consideration of such system noise is set in the comparator 122-2 to reduce the recognition error that may occur when the comparator 122-2 recognizes the regular frame pattern.

The history counter 122-3 counts the number of occurrences of the regular frame pattern each time it inputs a frame pattern recognition signal from the comparator 122-2 and stores the counted number of occurrences of the regular frame pattern in the frame memory 122-1 in real time. At the same time, the history counter 122-3 compares the number of occurrences of the regular frame pattern stored in the frame memory 122-1 with a predetermined reference frame pattern count. If the comparison result is that the number of occurrences of the regular frame pattern is equal to the predetermined reference frame pattern count, the history counter 122-3 generates a second compensation approval signal requesting data compensation of the frame and outputs the second compensation approval signal to the data compensator 122-4. The history counter 122-3 also counts the number of occurrences of the regular frame pattern on a pixel by pixel basis and stores the counted number of occurrences in the frame memory 122-1.

Although the history counter 122-3 is implemented so as to store the counted number of occurrences of the regular frame pattern in the frame memory 122-1 in the above example, the present disclosure is not limited to the example. In another example, the history counter 122-3 can be implemented so as to store the counted number of occurrences of the regular frame pattern in the history counter 122-3.

When the data compensator 122-4 has input the first compensation approval signal from the comparator 122-2 and the second compensation approval signal from the history counter 122-3, the data compensator 122-4 inserts compensation data into horizontal lines carrying no data among horizontal lines of the input frame.

For example, when frames C1, each including a progressive signal, have progressive patterns as shown in FIG. 7 before they are compensated, the data compensator 122-4 inserts compensation data into horizontal lines carrying no data among horizontal lines of each input frame to generate compensated frames C2. In this case, the compensated frames C2 of FIG. 7 have the same progressive pattern.

The data compensator 122-4 can be implemented so as to perform data compensation of input frames using compensation data preset in the data compensator 122-4.

The data compensator 122-4 can also be implemented so as to calculate an average value of the data of the input odd and even frames and to use the calculated average data as compensation data.

The data compensator 122-4 can also be implemented so as to use data of the highest or lowest gray level among the data of the input odd and even frames as compensation data.

As described above, according to the disclosure, each frame including a progressive signal is compensated for lack of data so that data is filled in horizontal lines of all frames, each including a progressive signal. This allows all consecutive frames to have data. Thus, the disclosed structure prevents flickering which would otherwise occur when data is absent in one of a series of neighboring frames. This also allows the polarity of data provided to each pixel to be reversed on a frame by frame basis. In this manner, the disclosed structure makes it possible to normally perform polarity inversion on a frame by frame basis, thereby preventing after-image and liquid crystal degradation which would otherwise occur when data of the same polarity is continuously provided to each pixel. According to the disclosed structure, a regular frame pattern is recognized on a pixel by pixel basis and frames are compensated for lack of data based on the recognized frame pattern, thereby preventing distortion of the original image which is an image before it is processed into an interlaced signal.

Figure 10:
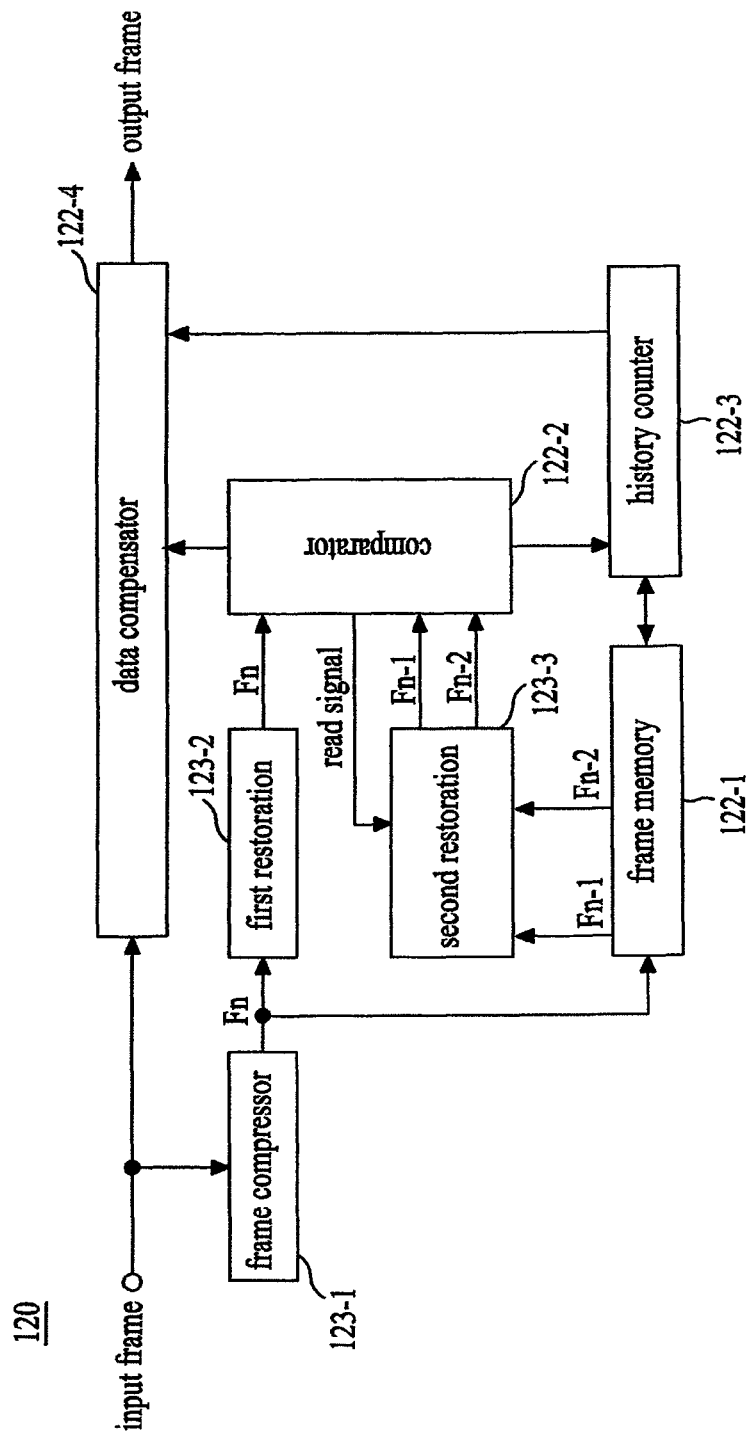
FIG. 10 is a block diagram of another embodiment of the frame processor shown in FIG. 4.

FIG. 10 is a block diagram of another embodiment of the frame processor shown in FIG. 4.

As shown in FIG. 10, the frame processor 120 according to this embodiment of the disclosure includes a frame memory 122-1, a comparator 122-2, a history counter 122-3, and a data compensator 122-4, which are similar to those of the frame processor 120 according to the embodiment shown in FIG. 9.

The frame processor 120 according to this embodiment of the disclosure further includes a frame compressor 123-1 for compressing an input frame, a first restoration unit 123-2 for restoring the current frame compressed by the frame compressor 123-1, and a second restoration unit 123-3 for reading and restoring compressed previous frames from the frame memory 122-1.

As described above with reference to FIG. 9, the frame memory 122-1 stores a last frame Fn-1 and a second last frame Fn-2, particularly a last frame Fn-1 and a second last frame Fn-2 compressed by the frame compressor 123-1.

The comparator 122-2 has the same function as described above with reference to FIG. 9. In this embodiment, the comparator 122-2 also has a function to generate a read signal requesting the second restoration unit 123-3 to read frames stored in the frame memory 122-1. Specifically, when the comparator 122-2 inputs the current frame Fn restored by the first restoration unit 123-2, the comparator 122-2 generates and outputs the read signal to the second restoration unit 123-3.

When a frame is input from the system, the frame compressor 123-1 compresses and outputs the input frame to the frame memory 122-1 and the first restoration unit 123-2.

The first restoration unit 123-2 decompresses the current frame Fn compressed by the frame compressor 123-1 to restore the current frame Fn before compression and outputs the restored current frame Fn to the comparator 122-2.

In response to the read signal input from the comparator 122-2, the second restoration unit 123-3 reads the compressed last frame Fn-1 and the compressed second last frame Fn-2 from the frame memory 122-1. The second restoration unit 123-3 then decompresses the compressed last frame Fn-1 and the compressed second last frame Fn-2 to restore the last frame Fn-1 and the second last frame Fn-2 before compression and outputs the restored frames Fn-1 and Fn-2 to the comparator 122-2.

While having the same technical features and advantages as those of the frame processor shown in FIG. 9, the frame processor according to this embodiment of the disclosure uses a frame compression scheme in order to reduce the capacity of the memory.

Although the current frame Fn, the last frame Fn-1, and the second last frame Fn-2 are compared and one or more horizontal lines carrying no data among horizontal lines of a progressive-processed frame are compensated with data using the comparison result in the above example, the disclosure is not limited to the example. In another example, the disclosed structure can be implemented such that the current frame Fn is compared with 3 or more previous frames which have been inputted before the current frame Fn and horizontal lines carrying no data are compensated with data using the comparison result.

As is apparent from the above description, the present disclosure provides an LCD and a method for driving the same with a variety of features and advantages. For example, one or more horizontal lines carrying no data among horizontal lines of a progressive-processed frame are compensated with data. This allows all frames, each including a progressive signal, to have data, thereby preventing flickering which would otherwise occur when data is absent in one of a series of neighboring frames. This also allows the polarity of data provided to each pixel to be reversed on a frame by frame basis. Thus, it is also possible to normally perform polarity inversion on a frame by frame basis, thereby preventing after-image and liquid crystal degradation which would otherwise occur when data of the same polarity is continuously provided to each pixel.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display comprising:
a frame processor that performs data compensation of at least one horizontal line carrying no data among horizontal lines of an input current frame;
a timing controller that controls a driving operation of the frame compensated by the frame processor; and
a data driver that supplies the frame compensated by the frame processor to a liquid crystal display panel under control of the timing controller,
wherein the frame processor compares a current frame with previous frames, generates a compensation approval signal according to a comparison result and inserts compensation data into horizontal lines carrying no data among horizontal lines of the current frame in response to the compensation approval signal, and
wherein data of the current frame and data of a second last frame to be supplied the liquid crystal display panel have the same polarity while the data of the current frame and data of a last frame to be supplied to the liquid crystal display panel have an opposite polarity,
wherein the frame processor includes:
a frame memory that stores the last frame and the second last frame that have been input before the current frame;
a comparator that compares the current frame with the last and second last frames stored in the frame memory, generates a first compensation approval signal when the current frame and the second last frame are identical while the current frame and the last frame are different, and generates a frame pattern recognition signal when a regular frame pattern, which repeats regularly every 3 frames, is recognized, a history counter that receives the frame pattern recognition signal from the comparator and counts the number of occurrences of the regular frame pattern and generates a second compensation approval signal when the counted number of occurrences of the regular frame pattern is equal to a predetermined reference frame pattern count, and a data compensator that performs data compensation of at least one horizontal line carrying no data among horizontal lines of the current frame only the first compensation approval signal from the comparator and the second compensation approval signal from the history counter are inputted.

2. The liquid crystal display according to claim 1, wherein the current frame, the last frame and the second last frame each include a progressive pattern.

3. The liquid crystal display according to claim 1, wherein the compensation data is preset in the data compensator.

4. The liquid crystal display according to claim 1, wherein the compensation data is an average of data of input odd and even frames.

5. The liquid crystal display according to claim 1, wherein the compensation data is data of a highest gray level among data of input odd and even frames.

6. The liquid crystal display according to claim 1, wherein the compensation data is data of a lowest gray level among data of input odd and even frames.

7. The liquid crystal display according to claim 1, wherein the timing controller and the frame processor are implemented as a single chip.

8. The liquid crystal display according to claim 1, wherein the frame processor further includes:

a frame compressor that compresses and stores an input frame in the frame memory;

a first restoration unit that decompresses a current frame compressed by the frame compressor to restore the current frame before compression and outputs the restored current frame to the comparator; and a second restoration unit that reads a compressed previous frame from the frame memory and decompresses the compressed previous frame to restore a previous frame before compression and outputs the restored previous frame to the comparator.

9. The liquid crystal display according to claim 8, wherein, when the current frame restored by the first restoration unit is input, the comparator generates and outputs a read signal to the second restoration unit.

10. The liquid crystal display according to claim 9, wherein the second restoration unit reads previous frames stored in the frame memory in response to the read signal.

* * * * *